Patented Oct. 6, 1953

2,654,755

UNITED STATES PATENT OFFICE 2,654,755

METHOD OF SYNTHESIZING PTERIDINES

Marvin J. Fahrenbach, Westfield, N. J., assignor to American Cyanamid Company, New York, N. Y., a corporation of Maine No Drawing. Application August 26, 1948, Serial No. 46,359

9 Claims. (Cl. 260—251.5)

This invention relates to an improved method of preparing substituted pteridines. More particularly, it relates to the preparation of 6- and 7-substituted pteridines.

In a co-pending application, Serial Number 686,716, filed July 27, 1946, now United States Patent 2,547,519, a method of synthesizing pteroylglutamic acid is described wherein 2-amino - 4 - hydroxy - 6 - halomethylpyrimido-[4,5-b]pyrazine is reacted with para-aminobenzoylglutamic acid at a temperature within the range of 80° C. to 150° C. in the presence of a non-aqueous liquid. Although this method gives good results, it requires the use of organic solvents and heating the reaction usually above 100° C.

I have now found that pteroylglutamic acid and related compounds can be prepared in excellent yields by reacting a 2 - amino - 4 - hydroxy - 6 - bromomethylpyrimido[4,5-b]pyrazine or a 2-amino - 4 - hydroxy - 7 - bromomethylpyrimido-[4,5-b]pyrazine with para-aminobenzoylglutamic acid and related compounds in the presence of water at lower temperatures. One of the more important compounds prepared by the process of the present invention is pteroylglutamic acid, as stated above, which may also be designated N-[4 - {[(2 - amino - 4 - hydroxy - 6 - pteridyl)-methyl]amino}benzoyl]glutamic acid. This compound has proven of great therapeutic value in the treatment of macrocytic anemias, sprue and other deficiency diseases of the circulatory system.

The improved method of this invention comprises essentially the step of mixing together a 2-amino-4-hydroxy-6 or 7-bromomethylpteridine with para-aminobenzoic acid or a salt, ester or amide of para-aminobenzoic acid such as preferably para-aminobenzoylglutamic acid. The reaction can be carried out within the range of from 0° C. to about 100° C. However, the preferred temperature range is 10° C. to about 30° C. The reaction may be carried out in water or in a substantially aqueous solvent which may consist of water and small amounts of water miscible solvents such as methanol, ethanol, butanol, Cellosolve and the like.

The bromomethylpteridines which I can use as intermediates in the present invention, are described and claimed in a co-pending application, Serial No. 35,069, filed June 24, 1948, now United States Patent 2,584,538. Included among these compounds are the following: 2 - amino - 4 - hydroxy - 6 - bromomethylpteridine; 2 - amino - 4 - hydroxy - 6 - dibromomethylpteridine; 2 - amino - 4 - hydroxy - 6 - bromomethyl - 7 - carboxypteridine; 2 - amino - 4 - hydroxy - 6 - bromo- methyl - 7 - methylpteridine; 2 - amino - 4 - hydroxy - 7 - bromomethylpteridine; 2 - amino - 4 - hydroxy - 7 - dibromomethylpteridine; 2 - amino - 4 - hydroxy - 6 - methyl - 7 - bromomethylpteridine; 2 - amino - 4 - hydroxy - 6 - carboxy - 7 - bromomethylpteridine, and 2 - amino - 4 - hydroxy - 6,7 - di(bromomethyl)pteridine.

In place of the preferred para-aminobenzoylglutamic acid I may use para-aminobenzoic acid itself or a salt, ester or amide thereof. The preferred amides are those of the amino acids such as specifically para-aminobenzoylaspartic acid, para-aminobenzoyl-beta-alanine, or para-aminobenzoylglycine or amides of amino acids having one or more peptide linkages such as para-aminobenzoyldiglutamylglutamic acid.

The reaction of the present invention will take place under practically any pH conditions, however, I prefer to carry out the reaction at a pH range of from about 9 to about 11.5. While the molar ratio of the reactants is not critical, I have found that excellent results are obtained when 4 to 5 moles of para-aminobenzoic acid or salt, ester or amide thereof is reacted with one mole of the bromomethylpteridine. In my preferred method of carrying out the reaction the para-aminobenzoic acid derivative is dissolved in water or a substantially aqueous solvent and the bromomethylpteridine is then added either dissolved in water or as a powder. After the reaction has been completed it is desirable to adjust the solution to pH 3 in order to precipitate the desired product which can then be removed from the reaction mixture by filtration.

The invention is illustrated in greater detail in the following specific examples in which the preferred product, pteroylglutamic acid and other related compounds are prepared. All parts are by weight unless otherwise indicated.

*Example 1*

To 116.8 parts of 2-amino-4-hydroxy-6-methylpteridine (approximately 90% purity) is added 1000 parts of molten trichloroacetic acid and after solution 97 parts of bromine is added. The mixture is heated on a steam bath, stirred, and lighted with a photoflood lamp for 45 minutes. After cooling, 400 parts of cold anhydrous ethyl alcohol is added. The precipitate (90 parts) is filtered off. To the filtrate is added 720 parts of ether and a precipitate forms. The precipitate is filtered and washed with 400 parts of hot ethanol. This precipitate weighs 60 parts. The total weight of both precipitates is 150 parts. These two fractions are mixed and 135 parts dissolved in 1500 parts by volume of 5.0 N hydrobromic acid heated to 78° C. This is concentrated to ½ volume under reduced pressure, chilled and 60 parts of material filtered off. The filtrate is concentrated under reduced pressure until the residue solidifies. To this 200 parts of ethyl alcohol is added and the mixture thoroughly stirred. The mixture is then chilled and 80 parts of ethyl alcohol added. The slurry is filtered and the precipitate weighs 42 parts. 36 parts of the last precipitate is dissolved in 244 parts of methyl cellosolve and 37 parts by volume of 30% hydrobromic acid in glacial acetic acid by heating on a steam bath. This is filtered and upon chilling in an ice bath, 15.5 parts of material is filtered off. To the filtrate is added 180 parts of ether and 16.5 parts of product is filtered off. On analysis the carbon, hydrogen, nitrogen and bromine values checked closely with the theoretical values for 2-amino-4-hydroxy-6-aminomethylpteridine.

Two and four tenths parts of p-aminobenzoylglutamic acid is slurried in about 62 parts of water, and 10 N sodium hydroxide solution is added until the pH is 11.0–11.5. Five tenths parts of 2-amino-4-hydroxy-6-bromomethylpteridine, as prepared above, is added slowly in small portions while the mixture is stirred vigorously. The pterin goes into solution readily. Stirring is continued for one hour at room temperature. During the addition of the pterin and during the hour following, the pH is maintained at 10.0 to 11.5 by the addition of small amounts of 10 N sodium hydroxide solution. The solution is then heated to 80° C. and concentrated hydrochloric acid is added dropwise with stirring until pH 3.0 is reached. A yellow precipitate comes out of solution at about pH 6. The mixture is again heated to 80° C. and then placed in the chill room overnight. The following day the yellow precipitate is filtered off, washed twice with water, ethanol and ether and air dried. A yield of 0.47 part of pteroylglutamic acid having a chemical assay of 46.3% and a bioassay of 47.6%, is obtained.

Example 2

To 4.8 parts of para-aminobenzoylglutamic acid is added 124 parts of water and sufficient 10 N sodium hydroxide to give a pH of 11.0–11.5. To this mixture is added one part of 2-amino-4-hydroxy-6-dibromomethylpteridine slowly in small portions while the mixture is stirred vigorously. During the addition of the pterin and for one hour after, the pH is maintained at 10 to 11.5 by the addition of small amounts of sodium hydroxide. Concentrated hydrochloric acid is added dropwise with stirring until pH 3.0 is reached. The mixture is heated to 80° C. and then placed in the chill room overnight. A yellow precipitate is filtered off, washed with water, ethanol and ether and air dried. A yield of 0.96 part of pteroylglutamic acid is obtained, which on chemical assay showed 10.8% and on bioassay showed 8.25% pure material.

Example 3

In another experiment carried out under the conditions of Example 1 wherein 2-amino-4-hydroxy-6-bromomethylpteridine is reacted with para-aminobenzoylglutamic acid, a product is obtained which on chemical assay gave 22.9% and on bioassay 19.1% pteroylglutamic acid.

Example 4

A further experiment carried out under the conditions of Example 1 with the exception that the reaction mixture is heated to 80° C. after acidification only. The product obtained in this reaction shows 27.3% pteroylglutamic acid on chemical assay and 15.85% on bioassay.

Example 5

Another experiment using the same amount of reactants and conditions of Example 1 with the exception that the condensation is carried out at 40° C. and the mixture heated to 80° C. after acidification only. The product obtained showed 12.62% pteroylglutamic acid on chemical assay and 10.62% on bioassay.

Example 6

Another experiment using the reactants and conditions of Example 1 with the exception that the condensation is carried out at 80° C., gave a product which showed 9.0% pteroylglutamic acid on chemical assay and 9.93% on bioassay.

Example 7

Seven parts of para-aminobenzoylglutamic acid is slurried in 250 parts of water, and 5 N sodium hydroxide (about 15 parts by volume) is added to give a faint spot on benzoazurine test paper (pH about 10.0 to 11.0). Then 3.5 parts of 2-amino-4-hydroxy-6-bromomethylpteridine is added slowly as a slurry in 100 parts water. During the addition, about 5 parts by volume of 5 N sodium hydroxide is added to maintain pH 10.0 to 11.0. The red-brown solution obtained is allowed to stand at room temperature for one hour; the pH is checked frequently during this time, and a small amount of 5 N sodium hydroxide is added to keep the pH between 10.0 and 11.0. Dilute (5 N) hydrochloric acid is added to bring the pH to 7.0, and the dark brown material is filtered off. The deep yellow filtrate is acidified with 5 N hydrochloric acid to pH 3.0 to 4.0, and the light yellow-brown precipitate filtered off, washed with water and ethanol, and dried overnight at 50° C. A yield of 1.66 parts of pteroylglutamic acid is obtained.

Example 8

1.07 parts 2,4,5-triamino-6-hydroxypyrimidine dihydrochloride is dissolved in 25 parts by volume of 2.5 N hydrobromic acid and 1.22 parts dibromodiacetyl in 8 parts of ethyl alcohol is added. After one hour at room temperature the solution is left in the chill room overnight. The solution is filtered from a small amount of crystalline material and the filtrate diluted with 100 parts of cold water. After cooling 6 hours in ice, the crystalline product is filtered off, washed with water, acetone and ether. Dried weight 0.9 part. This material on analysis gave the correct values for 2-amino-4-hydroxy-6,7-di(bromomethyl)pteridine.

15 parts of 2-amino-4-hydroxy-6,7-di(bromomethyl)pteridine is dissolved in 210 parts by volume of 48% hydrobromic acid and diluted to 750 parts by volume with water (2.5 N hydrobromic acid). The solution is warmed to 55° C. and stirred while dropping in 7.13 parts KI in 25 parts water over one hour. An iodine color slowly develops. The solution is kept at 55° C. one hour more and then cooled to 15° C. Sodium hydrosulfite is added until the dark iodine color is discharged and most of the black precipitate redissolves. The solution is filtered and neutralized to pH 1 with a saturated sodium acetate solution. The precipitate is filtered off, washed and dried. A yield of 12.1 parts of product is obtained which is predominately 2-amino-4-hydroxy-6-bromomethyl-7-methylpteridine.

The above product is added in portions over 20 minutes to a solution of 50 parts para-aminobenzoylglutamic acid in 800 parts of water at pH 11. The pH is maintained at 11 by addition of 10 N sodium hydroxide solution. When all is in solution, 8 parts by volume of 10 N sodium hydroxide is added and the solution is heated to 90° C. for 15 minutes to decompose the isomeric 2-amino-4-hydroxypteridine-6-methyl-7-para-aminobenzoylglutamic acid. The solution is treated with activated carbon and acidified to pH 1.3 with 70.5 parts of concentrated hydrochloric acid. The precipitate is centrifuged and washed. This is dissolved in 8000 parts by volume of 0.1 N sodium hydroxide and heated to 90° C., and there is added 148 parts by volume of 30% calcium chloride, and the insolubles are removed by filtration. To the filtrate at 45° C. is added 5% zinc chloride solution to pH 10.95, and it is filtered. Zinc chloride solution is added to the filtrate to pH 6.7 and the precipitate containing the product filtered off. A yield of 6.56 parts of N-[4-{[(2-amino-4-hydroxy-7-methyl-6-pyrimido[4,5-b]pyrazyl)-methyl]-amino}benzoyl]glutamic acid is obtained.

Example 9

A solution of 43 parts of 2-amino-4-hydroxy-6,7-dimethyl-pteridine dissolved in 4300 parts of water and 130 parts by volume of 10 N sodium hydroxide solution is heated to 92°–94° C. and stirred continuously. To the solution is added 71.2 parts of potassium permanganate over about 15 minutes which is used up quite rapidly. A further quantity of 7 parts of potassium permangante is added which is not all used up in 20 minutes. A little alcohol is added to destroy the potassium permanganate and the manganese dioxide is filtered out. The hot filtrate is added slowly with stirring to 2000 parts of water plus 235 parts of concentrated hydrochloric acid. After cooling, the product is filtered off, washed well and dried. A yield of 48 parts of 2-amino-4-hydroxy-6-methyl-7-carboxypteridine is obtained.

To 40 parts of 2-amino-4-hydroxy-6-methyl-7-carboxypteridine dissolved in 640 parts by volume of 48% hydrobromic acid at 95° C. is added with stirring, 31.2 parts of bromine in 80 parts by volume of 48% hydrobromic acid over a period of 30 minutes and heating is continued for 1.5 hours. The solution is cooled and poured into a stirred mixture of 1600 parts of ice and water and 100 parts of diatomaceous earth. The precipitate is filtered off and washed with water. The filter cake is slurried in a little water and added in portions to a solution of 120 parts of para-aminobenzoylglutamic acid in 2500 parts of water at pH 11. The pH is maintained by the addition of 10 N sodium hydroxide as necessary. Thirty (30) minutes after all has been added the diatomaceous earth is filtered off, and the filtrate is heated to 90° C. and added in a slow stream to 2000 parts of water and 294 parts of concentrated hydrochloric acid at 90° C. After cooling, the product is filtered off. This is further purified by dissolving in 20,000 parts by volume of 0.1 N sodium hydroxide at 94° C. and adding 370 parts by volume of 30% calcium chloride. After filtering, 470 parts of concentrated hydrochloric acid is added to the hot filtrate. It remains clear a few minutes and then a yellow precipitate forms. After cooling, the precipitate is filtered off and the purification is repeated from 15,000 parts by volume of 0.1 N sodium hydroxide. A yield 11.73 parts is obtained which on chemical assay showed 80% of N-[4-{[(2-amino-4-hydroxy-7-carboxy-6-pyrimido[4,5-b]pyrazyl)methyl]amino}benzoyl]glutamic acid.

Example 10

A solution of 50 parts of 2-amino-4-hydroxy-7-methylpteridine in 3000 parts by volume of 48% hydrobromic acid is prepared at steam bath temperature. To this vigorously stirred solution is added dropwise a solution of 156 parts bromine in 300 parts by volume of 48% hydrobromic acid. This solution is heated for 20 minutes more, concentrated to 500 parts, chilled overnight, filtered and evaporated to dryness. The residue is ground to a fine powder in water and diluted to 3000 parts. The suspended product is collected, washed and dried. A yield of 60 parts of 2-amino-4-hydroxy-7-bromomethylpteridine is obtained.

48 parts of the above 7-bromomethylpterin is added in small portions to a solution of 192 parts of para-aminobenzoylglutamic acid in 5000 parts of water at pH 10-11.5. The pH is maintained at pH 10-11.5 during the addition and for 1 hour more. This solution is then heated to 80° C., neutralized to pH 3, chilled overnight and filtered. The resulting wet cake is dissolved in 294 parts of concentrated hydrochloric acid, treated with activated charcoal, filtered, diluted to 2500 parts by volume with water, chilled at 5° C. overnight, filtered free of black tar, chilled at 5° C. the second time for 24 hours and filtered. The product, N-[4-{[(2-amino-4-hydroxy-7-pteridyl)methyl]amino}benzoyl]glutamic acid, is washed and dried; weight 17.5 parts, chemical assay 73.3%.

Example 11

A solution of 1 part of 2-amino-4-hydroxy-7-methylpteridine in 30 parts by volume of 48% hydrobromic acid containing 6.2 parts of bromine is prepared. This solution is heated in a sealed tube on a steam bath for 3 hours. The hydrobromic acid is evaporated on the steam bath with reduced pressure. The residue is taken up in 16.8 parts of ethylene glycol. To this solution is added a solution of 1.5 parts of para-aminobenzoylglutamic acid in 16.8 parts of ethylene glycol and an excess of potassium acetate to give a pH of about 4. The mixture is heated on the steam bath overnight and then poured into 150 parts of water. The precipitated product is collected, washed and dried. It contained 30.4% of N-[4-{[(2-amino-4-hydroxy-7-pyrimido[4,5-b]pyrazyl)methyl]amino}benzoyl]glutamic acid as shown by chemical assay.

Example 12

40 parts of 2-amino-4-hydroxy-7-methylpteridine is brominated and a yield of 51 parts of 2-amino-4-hydroxy-7-dibromomethylpteridine is obtained. The second crop, obtained from evaporating the filtrate from the 2-amino-4-hydroxy-7-dibromomethylpterin suspending in water, and collecting, is added in small portions to a solution of 81.5 parts of para-aminobenzoylglutamic acid in 2110 parts of water which is adjusted to pH 10.5. The pH is maintained at pH 10-11 during the addition and for 1 hour after. The product is obtained by heating to 80° C., neutralizing to pH 3, cooling and filtering. A yield of 12 parts of product is obtained which is identical with the product obtained in Example 10.

Example 13

To 5 parts of 2-amino-4-hydroxy-6,7-dimethylpteridine stirred with 250 parts by volume of 48% hydrobromic acid and heated to 95° C. is added all at once 4.2 parts of bromine in 10 parts by volume of 48% hydrobromic acid. The dimethyl pterin goes into solution in a few minutes and the bromine color disappears rapidly. After 10 minutes the solution is cooled in ice 1 hour and the crystalline precipitate filtered off, washed and dried. A yield of 3.5 parts of 2 - amino - 4 - hydroxy - 6 - methyl - 7 - bromomethylpteridine is obtained.

The product obtained above is added to a solution of 20 parts of para-aminobenzoylglutamic acid in 350 parts of water at pH 11, keeping the pH at 11 by the addition of 10 N sodium hydroxide. After 30 minutes the solution is treated with activated charcoal and then acidified to a pH of 1.3 with hydrochloric acid. The crystalline precipitate is filtered off and washed well. It is then dissolved in 100 parts of water at a pH of 7.4 and freeze dried. The product weighed 5.2 parts and on chemical assay showed 93.5% N - [4 - {[(2 - amino - 4 - hydroxy - 6 - methyl - 7 - pyrimido[4,5 - b]pyrazyl)methyl]amino} benzoyl]glutamic acid.

Example 14

To 800 volumes 2.5 N hydrochloric acid is added 28.2 parts 2,4,5-triamino-6-hydroxypyrimidine. The solution is saturated with sulfur dioxide at room temperature. To this solution is added 95.2 parts of ethyl alpha-oximino-beta-keto-gamma-bromobutyrate. Then, with vigorous agitation, the temperature is raised to 55° to 60° C. for 2 hours; during this time sulfur dioxide is bubbled slowly through the solution. The temperature is lowered to 30° C. and the unreacted oil (26 parts) is separated and discarded. A deep orange aqueous layer is extracted once with 200 volumes of ether to remove any remaining unreacted oil. Then 25 volumes concentrated sulfuric acid is added, and after allowing the solution to stand for 1 hour at 5° to 10° C. the precipitate triamine sulfate is filtered off. The filtrate is neutralized very slowly at 10° to 15° C., with concentrated ammonia to pH 3.0 to 4.0. The deep yellow-tan solid which precipitates is filtered off, washed well with cold water, ethanol and ether, and is dried 2 hours at 50° C. A yield of 15 parts of 2-amino-4-hydroxy-6-carboxy-7-bromomethylpteridine is obtained.

A slurry of 7 parts of para-aminobenzoylglutamic acid in 250 volumes water is prepared and 5 N sodium hydroxide is added to give a pH of about 10.0 to 11.0. Then a slurry of 3 to 4 g. of 2-amino-4-hydroxy-6-carboxy-7-bromomethylpteridine in 100 volumes water is added slowly. During this time 5 volumes of 5 N sodium hydroxide is added to maintain the pH at 10.0 to 11.0. The red-brown solution is allowed to stand at room temperature for 1 hour; the pH is checked frequently during this time, and a small amount of 5 N sodium hydroxide is added to keep the pH between 10.0 and 11.0. Dilute (5 N) hydrochloric acid is added to bring the pH to 7.0 and the dark brown, gelatinous material is filtered off, washed with water and acetone and dried 2 hours at 50° C. There is obtained 1.69 parts of N-[4-{[(2-amino-4-hydroxy-6-carboxy - 7 - pyrimido[4,5 - b]pyrazinyl)methyl]amino}benzoyl]glutamic acid, chemical assay 17%. The deep yellow filtrate is acidified with 5 N hydrochloric acid to pH 3.0 to 4.0 and the light yellow-brown solid is filtered off, washed with water and ethanol and dried 10 hours at 50° C. There is obtained 1.66 parts additional of N - [4 - {[(2 - amino - 4 - hydroxy - 6 - carboxy - 7 - pyrimido[4,5 - b]pyrazinyl)methyl]amino}-benzoyl]glutamic acid, chemical assay 36%.

Example 15

To 15 parts of para-aminobenzoylglutamic acid in 150 parts of water at pH 11 is added 2 parts of 2-amino-4-hydroxy-6,7-di(bromomethyl)pteridine in portions. The pH is maintained by addition of sodium hydroxide as necessary. The pH was lowered to 1 with hydrochloric acid and the product centrifuged and filtered, washed and dried. It contained 45% N,N'[4-{[(2-amino - 4 - hydroxy - 6,7 - pyrimido[4,5 - b]pyrazyl) - methyl]amino}benzoyl]glutamic acid on chemical assay.

Example 16

6.66 parts of para-nitrobenzoyl-alpha-glutamyl-alpha-glutamylglutamic acid is reduced with zinc and copper at a pH of 3 in the presence of 50% ethanol. The para-aminobenzoyl-alpha-glutamyl-alpha-glutamylglutamic acid obtained as a product is dissolved in water at pH of about 11. To this aqueous solution is added dropwise 3.36 parts of 2-amino-4-hydroxy-6-bromomethylpteridine hydrobromide dissolved in 40 parts by volume of methyl cellosolve. The reaction mixture is stirred during the reaction and for an additional ½ hour after the reaction is complete. The pH of the reaction mixture is adjusted to 3 with hydrochloric acid, whereupon the product precipitates, is separated and dried. There is obtained a yield of 4.5 parts of pteroyl-alpha - glutamyl - alpha - glutamylglutamic acid, chemical assay 46.2%.

Example 17

A further experiment is carried out using the procedure of Example 16 in which 4.24 parts of para - aminobenzoyl - gamma - glutamyl - gamma-glutamylglutamic acid is reacted with 0.5 part of 2 - amino - 4 - hydroxy - 6 - bromomethylpteridine. A yield of 0.44 part is obtained which on chemical assay showed 43% of pteroyl-gamma - glutamyl - gamma - glutamylglutamic acid.

Example 18

In another experiment using the procedure of Example 16, para-aminohippuric acid is reacted with 2 - amino - 4 - hydroxy - 6 - bromomethylpteridine. A yield of 10.6 parts is obtained which on chemical assay showed 38% of pteroylglycine.

Example 19

According to the procedure of Example 16, para-aminobenzoyl-beta-alanine is reacted with 2 - amino - 4 - hydroxy - 6 - bromomethylpteridine and produced 21.7 parts (chemical assays 39%) of pteroyl-beta-alanine.

Example 20

A further experiment was carried out following the procedure of Example 16 in which para-aminobenzoyl morpholine is reacted with 2-amino-4-hydroxy-6-bromomethylpteridine. A yield of 0.5 part (chemical assay 62%) of pteroylmorpholine is obtained.

Other derivatives of para-aminobenzoic acid such as para-aminobenzamide, para-aminobenzophenone, para-aminobenzoylpiperidine, para-aminobenzoylethanolamine and para-aminobenzoyldiethanolamine can be reacted with 2-amino-4-hydroxy-6-bromomethylpteridine to produce respectively pteramide, pteroylbenzene, pteroylpiperidine, pteroylethanolamine and pteroyldiethanolamine.

I claim:

1. A method of preparing pteridines which comprises mixing together in a substantially aqueous solvent at a pH of about 9 to 11.5 a member of the group consisting of 2-amino-4-hydroxy-6-bromomethylpteridines and 2-amino-4-hydroxy-7-bromomethylpteridines with a member of the group consisting of para-aminobenzoic acid and its salts, esters and amides and after reaction thereof recovering the pteridine formed.

2. A method of preparing pteridines which comprises mixing together in a substantially aqueous solvent at a pH of about 9 to 11.5 a member of the group consisting of 2-amino-4-hydroxy-6-bromomethylpteridines and 2-amino-4-hydroxy-7-bromomethylpteridines with a member of the group consisting of para-aminobenzoic acid and its salts, esters and amides, allowing the reaction to take place within the temperature range of 0° C. to 100° C. and thereafter recovering the pteridine formed.

3. A method of preparing pteridines which comprises mixing together in a substantially aqueous solvent at a pH of about 9 to 11.5 a 2-amino-4-hydroxy-6-bromomethylpteridine with a member of the group consisting of para-aminobenzoic acid and its salts, esters and amides and thereafter recovering the pteridine formed.

4. A method of preparing pteridines which comprises mixing together in a substantially aqueous solvent at a pH of about 9 to 11.5 a member of the group consisting of 2-amino-4-hydroxy-6-bromomethylpteridines and 2-amino-4-hydroxy-7-bromomethylpteridines with an amino acid amide of para-aminobenzoic acid and thereafter recovering the pteridine formed.

5. A method of preparing pteridines which comprises mixing together in a substantially aqueous solvent at a pH of about 9 to 11.5, 2-amino-4-hydroxy-6-bromomethylpteridine with an amino acid amide of para-aminobenzoic acid, allowing the reaction to take place within the temperature range of 0° C. to 100° C. and thereafter recovering the pteridine formed.

6. A method of preparing pteroylglutamic acid which comprises mixing together in a substantially aqueous solvent at a pH of about 9 to 11.5 2 - amino - 4 - hydroxy - 6 - bromomethylpteridine with a para-aminobenzoylglutamic acid and thereafter recovering pteroylglutamic acid.

7. A method of preparing pteroylglutamic acid which comprises mixing together in a substantially aqueous solvent at a pH of about 9 to 11.5 2 - amino - 4 - hydroxy - 6 - di - bromomethylpteridine with para-aminobenzoylglutamic acid and thereafter recovering pteroylglutamic acid.

8. A method of preparing N-[4-{[(2-amino-4-hydroxy - 7 - pteridyl) methyl]amino}benzoyl]-glutamic acid which comprises mixing together in a substantially aqueous solvent at a pH of about 9 to 11.5 a 2-amino-4-hydroxy-7-bromomethylpteridine and para-aminobenzoylglutamic acid and recovering the pteridine formed.

9. A method of preparing pteroyl diglutamylglutamic acid which comprises mixing together in a substantially aqueous solvent at a pH of about 9 to 11.5 2-amino-4-hydroxy-6-bromomethylpteridine with para-aminobenzoyldiglutamylglutamic acid and thereafter recovering the pteroyldiglutamylglutamic acid.

MARVIN J. FAHRENBACH.

No references cited.